(12) United States Patent
Kojima

(10) Patent No.: US 7,539,516 B2
(45) Date of Patent: May 26, 2009

(54) WIRELESS BASE STATION APPARATUS

(75) Inventor: Junichirou Kojima, Tokyo (JP)

(73) Assignee: NEC Corporation, Tokyo (JP)

( * ) Notice: Subject to any disclaimer, the term of this patent is extended or adjusted under 35 U.S.C. 154(b) by 547 days.

(21) Appl. No.: 11/165,491

(22) Filed: Jun. 24, 2005

(65) Prior Publication Data
US 2005/0288060 A1 Dec. 29, 2005

(30) Foreign Application Priority Data
Jun. 24, 2004 (JP) ............................. 2004-186465

(51) Int. Cl.
*H04M 1/00* (2006.01)
*H04B 1/38* (2006.01)
(52) U.S. Cl. .................................. 455/561; 455/422.1
(58) Field of Classification Search ................ 455/550, 455/561, 7, 11.1, 422.1, 500, 507
See application file for complete search history.

(56) References Cited

U.S. PATENT DOCUMENTS

2003/0123401 A1* 7/2003 Dean ........................... 370/318

2004/0166802 A1* 8/2004 McKay et al. ................. 455/15

FOREIGN PATENT DOCUMENTS

| JP | H11-284639 | 10/1999 |
| JP | 2002-369244 | 12/2002 |
| JP | 2004-153646 | 5/2004 |

* cited by examiner

*Primary Examiner*—Quochien B Vuong
(74) *Attorney, Agent, or Firm*—Dickstein Shapiro LLP

(57) ABSTRACT

A wireless base-station system includes a base-station main apparatus, multiple local wireless apparatuses for transmitting/receiving baseband signals for respective mobile terminal devices to/from the base-station main apparatus, and a baseband server. The baseband server distributes a downlink signal, containing the baseband signal to be transmitted from a high-order apparatus to the mobile terminal device via the base-station main apparatus, to the local wireless apparatuses installed in the sub areas in the service area in which the mobile terminal device exists. The baseband server further combines multiple uplink signals which are received from the local wireless apparatuses installed in each sub area in the sub area in which the mobile terminal device exists and which are to be transmitted from the mobile terminal apparatuses to the high-order apparatus. The baseband server further transmits a resulting uplink composite signal to the base-station main apparatus.

7 Claims, 4 Drawing Sheets

WIRELESS BASE STATION APPARATUS

This application claims priority to prior Japanese patent application JP 2004-186465, the disclosure of which is incorporated herein by reference.

BACKGROUND OF THE INVENTION

The present invention relates to wireless base-station systems which are provided in mobile communication systems employing Code Division Multiple Access technology and which perform wireless communication with mobile terminal devices. More specifically, the present invention relates to a wireless base-station system which includes a base-station main apparatus and local wireless apparatuses.

In mobile communication systems employing Code Division Multiple Access (hereinafter called CDMA) technology, since a range where radio waves from a wireless base-station system reach is a communication area, mobile terminal devices cannot be used in dead zones which are beyond the reach of radio waves from a wireless base-station system, that is, in tunnels and underground areas.

In mobile communication systems of recent years, with the widespread use of mobile terminal devices such as mobile telephones, since a wireless base-station system needs to process data for a large number of users, the apparatus configuration is increasingly becoming complicated and large. Thus, a configuration in which the wireless base-station system is separated into a base-station main apparatus and local wireless apparatuses is known. In the configuration, the base-station main apparatus performs processing on a baseband signal for each mobile terminal device and the local wireless apparatuses amplify power for an RF (radio frequency) signal, modulate and demodulate the RF signal, and have antenna devices.

The local wireless apparatus is relatively small compared to the base-station main apparatus and thus can be installed in a subway station premise or underground arcade. Thus, such a configuration is also effective to eliminate the dead zones.

In general, since a communication area managed by a wireless base-station system is divided into a plurality of service areas 106-1 to 106-m (m is a positive integer), as shown in FIG. 1, local wireless apparatuses 103, which have a similar configuration, are installed in the respective service areas 106-1 to 106-m which are away from a base-station main apparatus 101 and the local wireless apparatuses 103 are connected to the base-station main apparatus 101 through respective optical transmission paths (e.g., optical fibers) 104.

For the purpose of expanding a service area for a wireless base-station system, Japanese Unexamined Laid-Open Publication (JP-A) No. 11-284639 discloses a configuration in which a large number of slave repeaters for performing wireless communication with mobile terminal devices and a master repeater relays a signal transmitted/received between a base-station main apparatus and each slave repeater. The configuration of such a wireless base-station system including a master repeater and multiple slave repeaters is shown in FIG. 2.

FIG. 2 is a block diagram showing the configuration of a known wireless base-station system including a master repeater and multiple slave repeaters.

The known wireless base-station system shown in FIG. 2 includes a base-station main apparatus 201, a master repeater 202 for transmitting/receiving an RF signal to/from the base-station main apparatus 201, and multiple slave repeaters 203 connected with the master repeater 202 via optical transmission paths. Only one slave repeater 203 is shown in FIG. 2.

The base-station main apparatus 201 generates an RF signal for communication with each mobile terminal device and transmits the signal to the master repeater 202. On the basis of Patent Application Publication he RF signal received from the slave repeater 203 via the master repeater 202, the base-station main apparatus 201 reproduces a signal for each mobile terminal device and transmits the signal to a high-order apparatus (not shown), such as a known exchange.

The master repeater 202 has an optical/electrical (O/E) converter 205 to convert an RF signal received from the base-station main apparatus 201 into an optical signal and to convert an optical signal received from each slave repeater 203 into an RF signal.

The slave repeater 203 includes an antenna device 208, an O/E converter 206 for converting an optical signal received from the master repeater 202 into an RF signal and converting an RF signal to be transmitted to the master repeater 202 into an optical signal, and a duplexer (DUP) 207 for switching transmission channels between the O/E converter 206 and the antenna device 208 in response to the transmission/reception of an RF signal. The optical signal transmitted/received between the master repeater 202 and the slave repeater 203 is generated by performing analog modulation on light based on an RF signal.

With this configuration, when an RF signal for each mobile terminal device is transmitted from the base-station main apparatus 201 to the master repeater 202, the RF signal is converted by the O/E converter 205 into an optical signal, which is then distributed to the slave repeaters 203. In the slave repeater 203, the O/E converter 260 converts the optical signal received from the master repeater 202 into an RF signal and the duplexer 207 radiates the RF signal into the service area 204 via the antenna device 208.

On the other hand, an RF signal received by the antenna device 208 of the slave repeater 203 is converted by the O/E converter 206 via the duplexer 207 into an optical signal, which is then transmitted to the master repeater 202 via the optical transmission path. In the master repeater 202, the optical signal received from the slave repeater 203 is converted by the O/E converter 205 into an RF signal, which is then combined with RF signals received from the respective slave repeaters and the resulting signal is transmitted to the base-station main apparatus 201.

Since the wireless base-station system shown in FIG. 1 has a configuration in which the local wireless apparatus is installed for each service area having a predetermined area, there are some problems. For example, at a place where a wide service area is required even though the subscriber density is low, for example, in a mountain region or sparsely-populated region, or at a place where a large number of relatively small service areas are required because of the intricate topography, for example, in a building or in an region in which large-scale buildings are close together, an area which can be covered is limited due to shortage of the number of areas. As a result, a "dead zone" is created, even if the subscriber capacity can be ensured.

With the configuration (shown in FIG. 2) in which the O/E converters 205 and 206 are used to transmit/receive an RF signal between the master repeater 202 and the slave repeater 203, the NF (noise figure) is severely degraded by the O/E converters 205 and 206. Thus, there is a problem in which the reception sensitivity of the slave repeater 203 is reduced and thus the service area cannot be expanded.

SUMMARY OF THE INVENTION

The present invention has been made to overcome the problems of the related art, and an object of the present invention is to provide a wireless base-station system which can prevent the creation of a dead zone due to the shortage of the number of areas and which can expand the service area.

A wireless base-station system according to a first aspect of the present invention includes a base-station main apparatus which performs processing on a baseband signal for each mobile terminal device, and a plurality of local wireless apparatuses which are installed in sub areas into which each service area is divided and which perform wireless communication with the mobile terminal devices and transmit/receive the baseband signal for each mobile terminal device to/from the base-station main apparatus. The wireless base-station system further includes a baseband server which distributes a downlink signal, containing the baseband signal to be transmitted from a high-order apparatus to the mobile terminal device via the base-station main apparatus, to the local wireless apparatuses installed in the sub areas in the service area in which the mobile terminal device exists, the baseband server combining multiple uplink signals, containing the baseband signals to be transmitted from the mobile terminal devices to the high-order apparatus via the local wireless apparatuses, and transmitting a resulting uplink composite signal to the base-station main apparatus.

A wireless base-station system according to a second aspect of the present invention includes a base-station main apparatus which performs processing on a baseband signal for each mobile terminal device, and a plurality of local wireless apparatuses that are installed in sub areas into which each service area is divided, local wireless apparatuses performing wireless communication with the mobile terminal devices and transmitting/receiving the baseband signal for each mobile terminal device to/from the base-station main apparatus. At least one of the local wireless apparatuses provided in each service area includes a combining/distributing unit. The combining/distributing unit distributes a downlink signal, containing the baseband signal which is received from the base-station main apparatus and which is to be transmitted from a high-order apparatus to the mobile terminal device, to the local wireless apparatuses installed in the sub areas in the service area in which the mobile terminal device exists. The combining/distributing unit combines multiple uplink signals, containing the baseband signals to be transmitted to the high-order apparatus, and transmits a resulting uplink composite signal to the base-station main apparatus.

With the wireless base-station system configured as described above, the baseband server or the combining/distributing unit in the local wireless apparatus distributes a downlink signal, containing the baseband signal, to the local wireless apparatuses for each service area, combines multiple uplink signals, containing the baseband signals transmitted from the mobile terminal devices, for each service area, and transmits a resulting uplink composite signal to the base-station main apparatus. Thus, the base-station main apparatus can perform processing by regarding the multiple local wireless apparatuses installed in the service area as one local wireless apparatus. In addition, since the baseband signals are transmitted/received between the base-station main apparatus and the local wireless apparatuses, wireless units for processing RF signals may be provided in only the local wireless apparatuses.

With the wireless base-station system configured as described above, since the base-station main apparatus can perform processing by regarding the multiple local wireless apparatuses installed in the service area as one local wireless apparatus. Thus, the local wireless apparatuses according to the number of sub areas can further be connected to the base-station main apparatus having a configuration similar to the known configuration. This arrangement, therefore, can expand the service area of the wireless base-station system with relative ease and can prevent creation of a dead zone due to the shortage of the number of service areas.

Since baseband signals are transmitted/received between the base-station main apparatus and the local wireless apparatuses, the arrangement may be such that the wireless units for processing RF signals are provided only in the local wireless apparatuses. Thus, the NF degradation caused by the O/E converters is reduced compared to the known configuration (shown in FIG. 2) in which the O/E converters are used to transmit/receive RF signals, thereby preventing reduction in the service area due to degradation in reception sensitivity. Accordingly, even when a communication service is provided for a service area having the same area, the area can be covered by a less number of sub areas than the known configuration shown in FIG. 2, thus making it possible to achieve a less expensive base-station system.

DESCRIPTION OF THE PREFERRED EMBODIMENT

The present invention will now be described with reference to the accompanying drawings.

Figure 3:
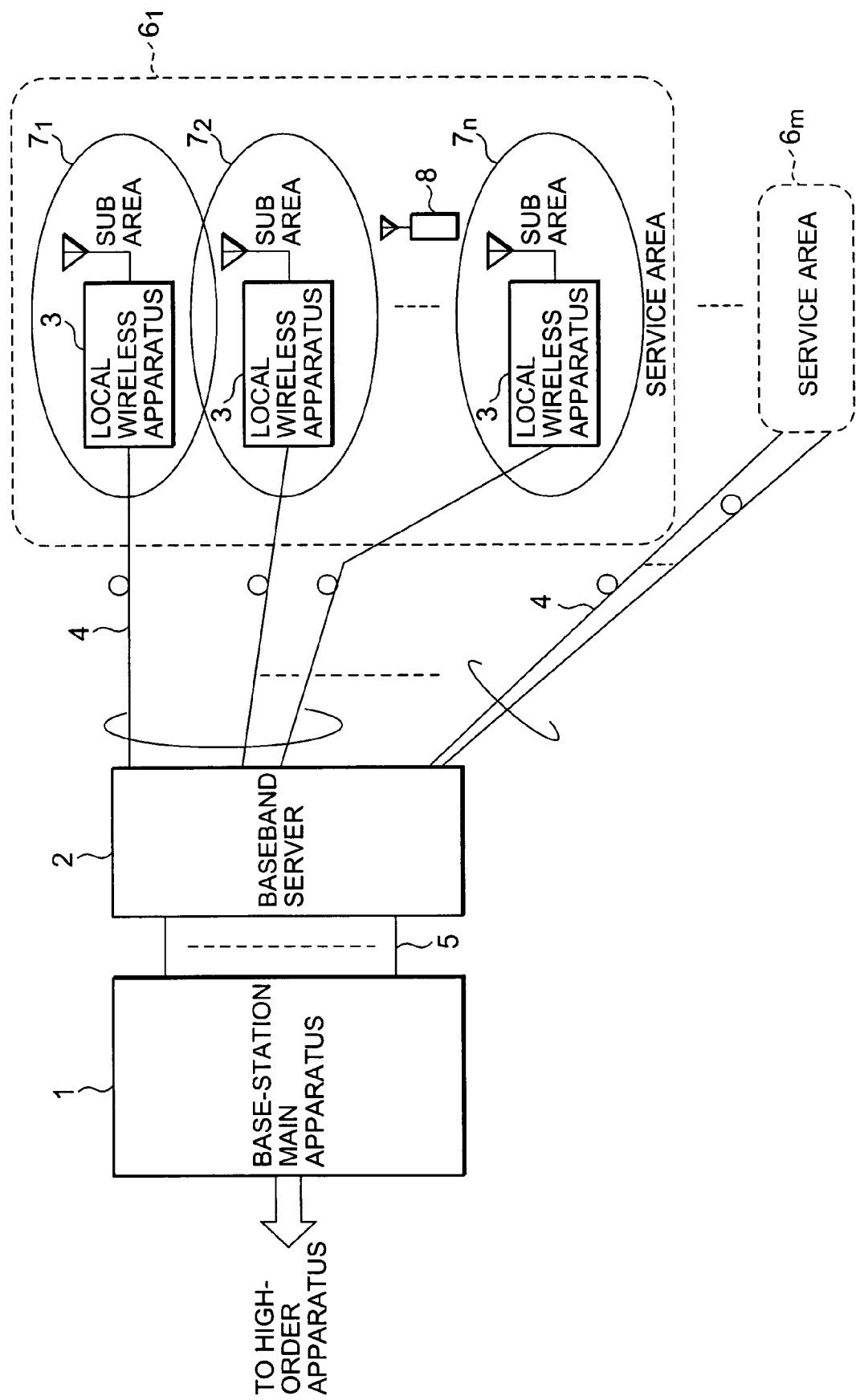
FIG. 3 is a block diagram of one exemplary configuration of a wireless base-station system according to the present invention.
Figure 4:
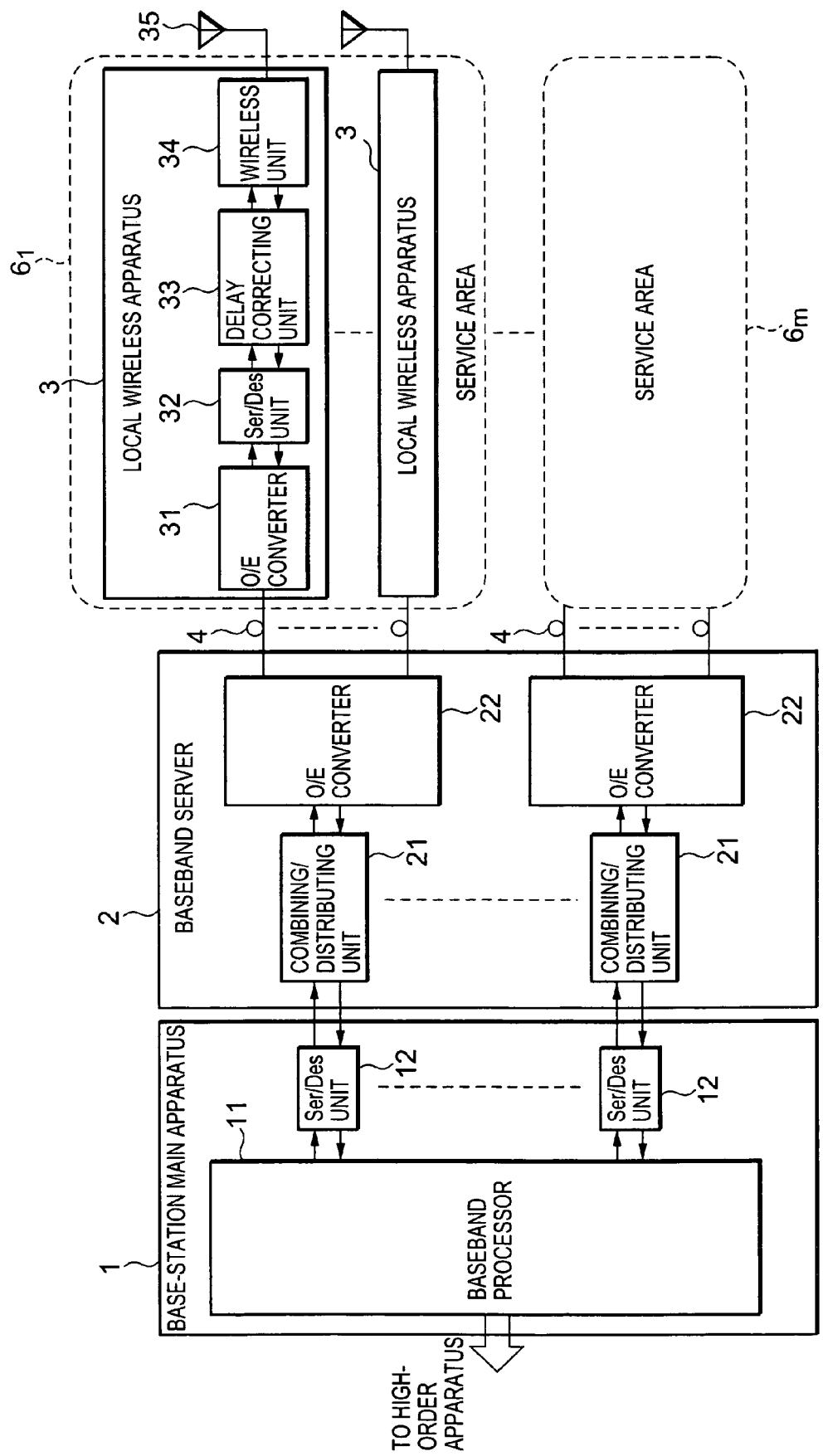
FIG. 4 is a block diagram of the configuration of a base-station main apparatus, a baseband server, and local wireless apparatuses shown in FIG. 3.

FIG. 3 is a block diagram showing one example of the configuration of a wireless base-station system of the present invention. FIG. 4 is block diagram showing the configuration a base-station main apparatus, a base band server, and local wireless apparatuses shown in FIG. 3.

As shown in FIG. 3, the wireless base-station system of the present invention includes a base-station main apparatus 1 for processing baseband signals for mobile terminal devices 8, multiple local wireless apparatuses 3, and a baseband server 2. The multiple local wireless apparatuses 3 performs wireless communication with each mobile terminal device 8 and transmitting/receiving baseband signals for each mobile terminal device 8 to/from the base-station main apparatus 1. The baseband server 2 relays the baseband signals transmitted/received between the base-station main apparatus 1 and the local wireless apparatuses 3.

In the present embodiment, as shown in FIG. 3, each of a plurality of m services areas 6-1 to 6-m is further divided into a plurality of sub areas 7-1 to 7-n (n is a positive integer), in which the respective local wireless apparatuses 3 are installed. That is, in the wireless base-station system of the present embodiment, m×n local wireless apparatuses 3 are connectable to the base-station main apparatus 1.

The baseband server 2 and the local wireless apparatuses 3, which are installed in the sub areas 7-1 to 7-n in the service areas 6-1 to 6-m, are connected through corresponding optical transmission paths (e.g., optical fibers) 4. The baseband server 2 and the base-station main apparatus 1 are connected through m wire transmission paths 5 provided so as to correspond to the service areas 6-1 to 6-m. The number of sub areas 7-1 to 7-n does not necessarily have to be the same for all the service areas 6-1 to 6-m, and thus may vary for each of the service areas 6-1 to 6-m.

The base-station main apparatus 1 performs known code-spreading processing or de-spreading processing on uplink signals or downlink signals transmitted/received between a high-order apparatus (not shown), such as a known exchange, and each mobile terminal device 8 in the service areas 6-1 to 6-m, to thereby generate baseband signals.

Each local wireless apparatus 3 performs wireless communication with the mobile terminal device 8 in the sub area managed by the local wireless apparatus 3. Each local wireless apparatus 3 further amplifies power for RF signals received and RF signals to be transmitted, modulates and demodulates the RF signals, and converts the frequencies between the RF signals and the baseband signals. The local wireless apparatus 3 further transmits/receives baseband signals for each mobile terminal device 8 to/from the base-station main apparatus 1 via the baseband server 2.

The baseband server 2 distributes downlink signals, which are transmitted from the high-order apparatus toward the mobile terminal device 8, to the n local wireless apparatuses 3 in the service area in which the corresponding mobile terminal device 8 exists. For the n local wireless apparatuses 3 in each of the service areas 6-1 to 6-m, the baseband server 2 also combines uplink signals to be transmitted to the high-order apparatus from the mobile terminal device 8 and transmits the composite signal to the base-station main apparatus 1.

As shown in FIG. 4, the base-station main apparatus 1 includes a baseband processor 11 for performing known code-spreading/de-spreading processing on transmission/reception signals for each mobile terminal device 8 and m serializer/deserializer (Ser/Des) units 12 for performing multiplexing and demultiplexing of the baseband signals. The m Ser/Des units 12 are provided so as to correspond to the service areas 6-1 to 6-m.

The baseband server 2 distributes the downlink signals, received from the base-station main apparatus 1, to the corresponding local wireless apparatuses 3 in the service areas 6-1 to 6-m.

The baseband server 2 has m combining/distributing units 21 for combining the uplink signals which is received from the local wireless apparatuses 3 with respect to each of the service areas 6-1 to 6-m and for transmitting the resulting composite signal to the base-station main apparatus 1.

The baseband server 2 further has m O/E converters 22 for converting electrical signals (i.e., baseband signals), received from the base-station main apparatus 1, into optical signals and converting optical signals, received from the local wireless apparatuses 3, into electrical signals (i.e., baseband signals). The baseband server 2 is installed, for example, in the vicinity of the base-station main apparatus 1 (e.g., in a base-station building). Also, the m combining/distributing units 21 are provided so as to correspond to the service areas 6-1 to 6-m. The m O/E converters 22 are provided so as to correspond to the service areas 6-1 to 6-m.

Each local wireless apparatus 3 includes an O/E converter 31, a Ser/Des unit 32, and a delay correcting unit 33. The O/E converter 31 converts the optical signals received from the baseband server 2 into electrical signals and converts electrical signals (i.e., baseband signals) to be transmitted to the baseband server 2 into optical signals. The Ser/Des unit 32 performs multiplexing/demultiplexing of the baseband signals. The delay correcting unit 33 corrects signal delay between the local wireless apparatuses 3 in the service area.

The local wireless apparatus 33 further includes a wireless unit 34 and an antenna device 35. The wireless unit 34 converts frequencies between the baseband signals and the RF signals, amplifies power for the RF signals, and modulates and demodulates the RF signals.

FIGS. 3 and 4 show a configuration in which the base-station main apparatus 1 and the baseband server 2 are connected through the m wire transmission paths 5. O/E converters may be provided between the Ser/Des units 12 in the base-station main apparatus 1 and the wire transmission paths 5 so as to allow optical signals to be transmitted/received between the base-station main apparatus 1 and the baseband server 2. In such a case, the base-station main apparatus 1 and the baseband server 2 are connected through optical transmission paths. Each combining/distributing unit 21 in the baseband server 2 converts downlink signals, i.e., optical signals received from the base-station main apparatus 1, into electrical signals and distributes the downlink signals to the local wireless apparatuses 3 in the corresponding one of the service areas 6-1 to 6-m. For each of the service areas 6-1 to 6-m, the combining/distributing unit 21 also combines uplink signals, received from the local wireless apparatuses 3 into a composite signal, converts the composite signals into optical signals, and transmits the optical signals to the base-station main apparatus 1.

An operation when downlink signals are transmitted in the wireless base-station system of the present embodiment will be described next.

Downlink signals (for voice or the like) transmitted from the high-order apparatus are subjected to spreading processing by the baseband processor 11 and the resulting signals are converted by the Ser/Des unit 12 into baseband signals containing serial data. In this case, the antenna device 35 included in each local wireless apparatus 3 have a diversity configuration and the Ser/Des unit 12 generates baseband signals, which are multiplexed binary downlink signals.

When the baseband server 2 receives a baseband signal from the base-station main apparatus 1, the combining/distributing unit 21 in the baseband server 2 copies the baseband signal to generate n copy signals. Each copy signal is converted by the O/E converter 22 from an electrical signal into a digitally modulated optical signal, which is then transmitted via the optical transmission path 4 to the local wireless apparatuses 3 in a service area in which a receiving-end mobile terminal device exists.

In each local wireless apparatus 3, the O/E converter 31 converts the downlink signal (optical signal) received from the baseband server 2 into an electrical signals and the Ser/Des unit 32 demultiplexes the electrical signal into binary parallel data. The delay correcting unit 33 corrects optical-transmission-path dependent delay so as to correspond to the longest optical transmission path of the n optical transmission paths 4 connected with the local wireless apparatuses 3 in the service area. After the correction, the wireless unit 34 modulates the RF signal according to a predetermination communication system and the antenna device 35 radiates the modulated RF signal into the corresponding sub area.

In this case, in the wireless base-station system of the present embodiment, the n local wireless apparatuses 3 in the same service area radiate the RF frequency signals, generated from the same baseband signal, into the sub areas managed by the corresponding local wireless apparatuses 3, at the same time. That is, since the same radio waves are radiated into the n sub areas at the same time, the processing performed by the base-station main apparatus on the sub areas can be regarded as being equivalent to processing on one sub area. Thus, the base-station main apparatus 1 can perform processing similar to a case in which one local wireless apparatus 3 is installed in each of the service areas 6-1 to 6-m.

An operation when an uplink signal is received in the wireless base-station system shown in FIG. 4 will be described next.

An RF signal transmitted from the mobile terminal device 8 in the sub area is received by the antenna device 35 of the local wireless apparatus 35 and is demodulated by the wireless unit 34 according to a predetermined communication system. The demodulated signal is output as a binary baseband signal. The delay of the binary baseband signal output from the wireless unit 34 is corrected by the delay correcting unit 33 in accordance with the delay of the corresponding optical transmission path 4. The resulting baseband signal is multiplexed and converted by the Ser/Des unit 32 into a baseband signal containing serial data. The multiplexed baseband signal is converted by the O/E converter 31 into a digitally modulated uplink optical signal, which is then transmitted to the baseband server 2 via the optical transmission path 4.

In the baseband server 2, the O/E converter 22 converts the uplink optical signal, received from the local wireless apparatus 3, into an electrical signal. Then, the combining/distributing unit 21 of the baseband server 2 sums uplink signals transmitted from the other local wireless apparatuses 3 in the same service area and the amplitudes of the uplink signals, and divides the resulting values by the number of sub areas to determine an average value. The baseband server 2 then transmits the average value to the base-station main apparatus 1 as an uplink signal (an uplink composite signal) for each service area.

In the base-station main apparatus 1, the Ser/Des unit 12 demultiplexes the uplink signal received from the baseband server 2 into binary parallel data and the baseband processor 11 despreads the parallel data and then transmits the resulting data to the high-order apparatus.

As described above, uplink signals transmitted from the n local wireless apparatuses 3 in the same service area are combined. The resulting composite signal is transmitted to the base-station main apparatus 1. Thus, the base-station main apparatus 1 may perform processing similar to a case in which one local wireless apparatus 3 is installed in each of the service areas 6-1 to 6-m, as in the processing for a downlink signal.

In the wireless base-station system of the present invention, when the mobile terminal device 8 moves between sub areas in the same service area, the base-station main apparatus 1 can perform processing which is equivalent to the processing for one local wireless apparatus 3. As a result, hand-off processing can be eliminated.

As described above, the combining/distributing unit 21 included in the baseband server 2 distributes a downlink signal, received from the base-station main apparatus 1, to the local wireless apparatuses 3 in the service area. The combining/distributing unit 21 further combines multiple uplink signals received from the local wireless apparatuses in the service area and transmits the resulting uplink signal to the base-station main apparatus 1. The combining/distributing unit 21, however, may be provided for arbitrary one or multiple ones of the local wireless apparatuses 3 provided in each service area.

In such a case, the configuration is as indicated below. Each one of local wireless apparatuses (hereinafter referred to as "local repeater apparatuses") which include combining/distributing unit which are provided in the service areas are connected to the base-station main apparatus 1. The local repeater apparatuses and the local wireless apparatuses 3 in the same service area are connected through optical transmission paths.

The operation of the extension repeater apparatus is analogous to the operation of the baseband server 2. For example, one extension repeater apparatus which has received a downlink signal from the base-station main apparatus 1 distributes the downlink signal to another extension apparatus 3 in the same service area through the optical transmission path. One extension repeater apparatus which has received uplink signals from the local wireless apparatuses 3 in the same service area combines the uplink signals to generate an uplink composite signal and transmits the signal to the base-station main apparatus 1.

According to the wireless base-station system of the present invention, since the base-station main apparatus 1 can perform processing by regarding the multiple local wireless apparatuses installed in the service area as one local wireless apparatus. Thus, the local wireless apparatuses 3 according to the number of sub areas can further be connected to the base-station main apparatus 1 having a configuration similar to the known configuration. This arrangement, therefore, can expand the service area of the wireless base-station system with relative ease and can prevent creation of a dead zone due to the shortage of the number of service areas.

Figure 1:
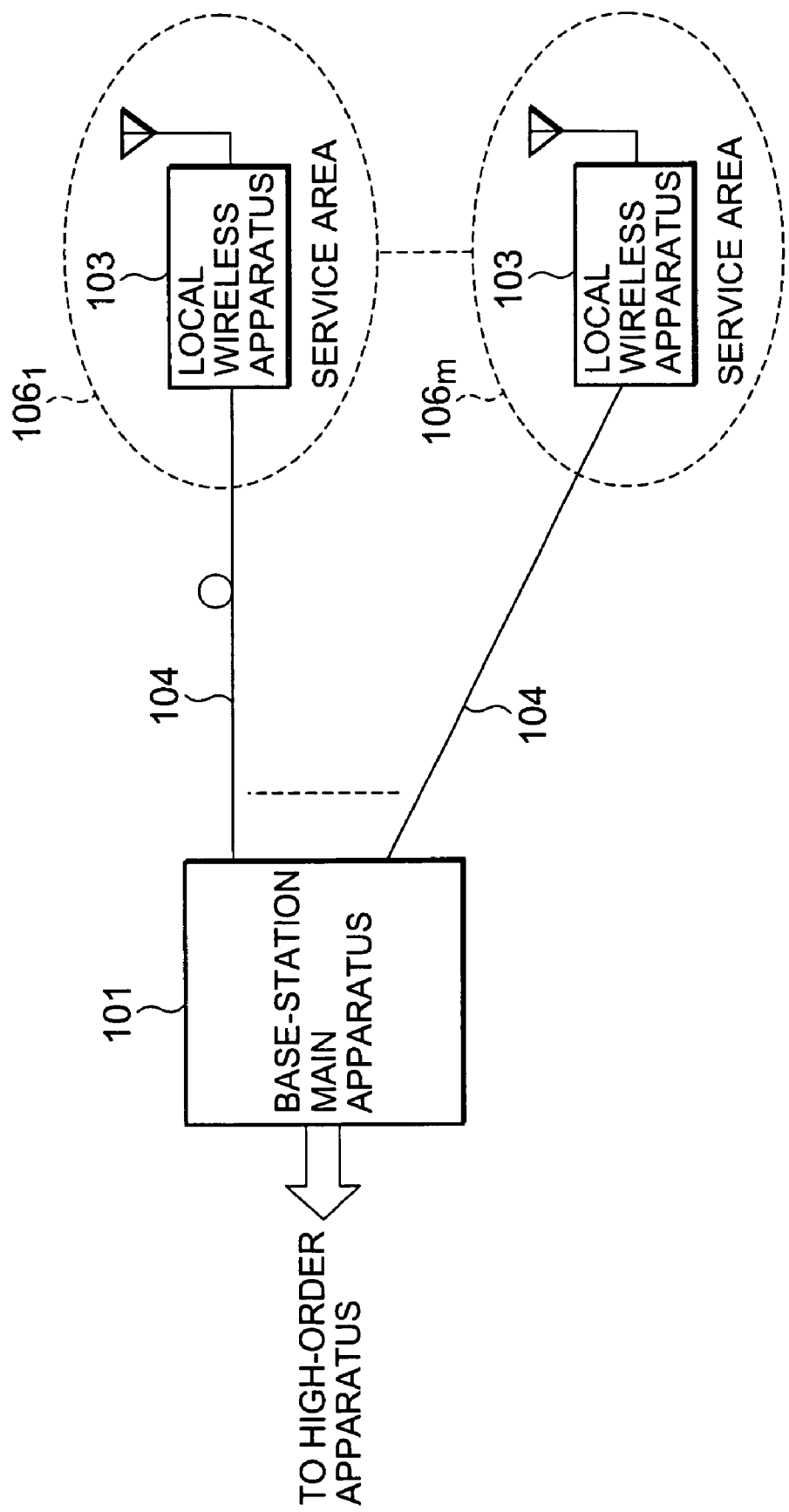
FIG. 1 is a block diagram of a typical configuration of a known wireless base-station system.
Figure 2:
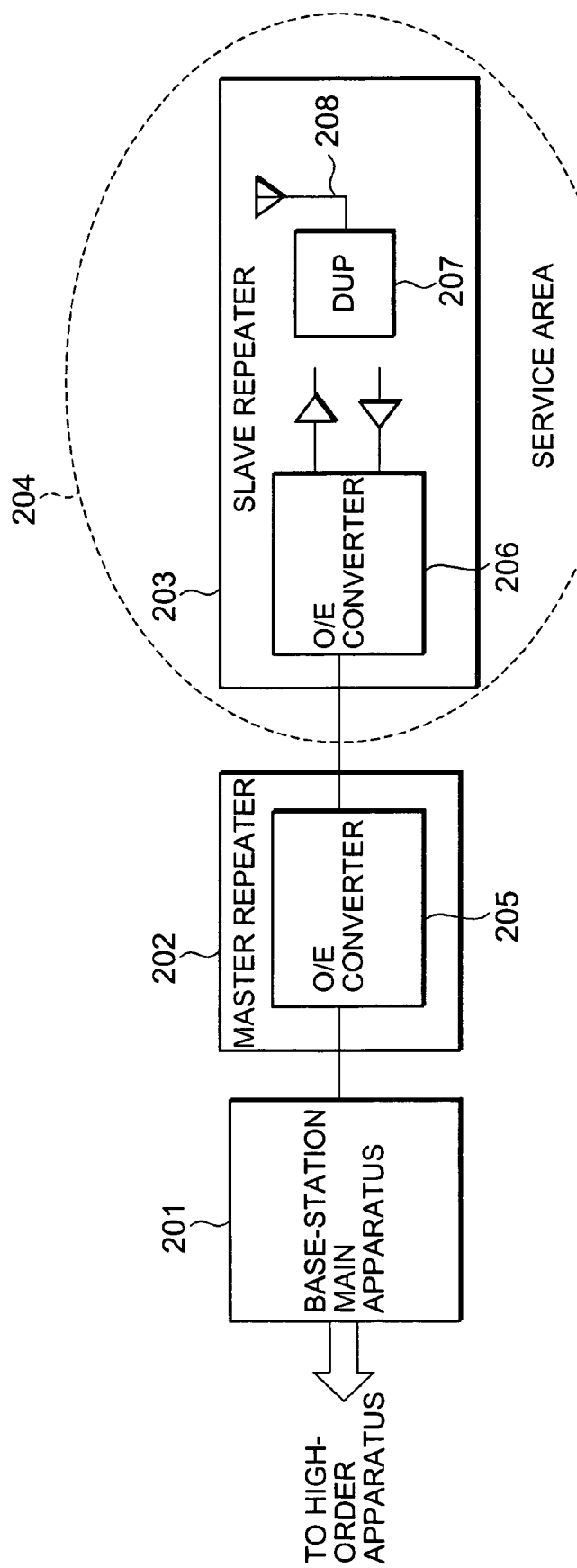
FIG. 2 is a block diagram of the configuration of a known wireless base-station system including a master repeater and multiple slave repeaters.

Since baseband signals are transmitted/received between the base-station main apparatus 1 and the local wireless apparatuses 3, the arrangement may be such that the wireless units for processing RF signals are provided only in the local wireless apparatuses 3. Thus, the NF degradation caused by the O/E converters is reduced compared to the known configuration (shown in FIG. 2) in which the O/E converters are used to transmit/receive RF signals, thereby preventing reduction in the service area due to degradation in reception sensitivity. Accordingly, even when a communication service is provided for a service area having the same area, the area can be covered by a less number of sub areas than the known configuration shown in FIG. 2.

What is claimed is:

1. A wireless base-station system which performs wireless communication with mobile terminal devices which exist in a plurality of service areas, the system comprising:

a base-station main apparatus which performs processing on a baseband signal for each mobile terminal device;

a plurality of local wireless apparatuses which are installed in sub areas into which each service area is divided, the local wireless apparatuses performing wireless communication with the mobile terminal devices and transmitting/receiving the baseband signal for each mobile terminal device to/from the base-station main apparatus; and a baseband server which distributes a downlink signal, containing the baseband signal to be transmitted from a high-order apparatus to the mobile terminal device via the base-station main apparatus, to the local wireless apparatuses installed in the sub areas in the service area in which the mobile terminal device exists, the baseband server combining multiple uplink signals, containing the baseband signals to be transmitted from the mobile terminal devices to the high-order apparatus via the local wireless apparatuses, and transmitting a resulting uplink composite signal to the base-station main apparatus, wherein the baseband server generates the uplink composite signal by determining an average value of multiple uplink signals received from the respective local wireless apparatuses installed in the sub areas.

2. The wireless base-station system according to claim 1, wherein, for each service area, the local wireless apparatuses radiate radio-frequency signals, generated from a same baseband signal, into the corresponding sub areas at a same time.

3. A wireless base-station system which performs wireless communication with mobile terminal devises which exist in a plurality of service areas, the system comprising:
   a base-station main apparatus which performs processing on a baseband signal for each mobile terminal device; and
   a plurality of local wireless apparatuses which are installed in sub areas into which each service area is divided, the local wireless apparatuses performing wireless communication with the mobile terminal devices and transmitting/receiving the baseband signal for each mobile terminal device to/from the base-station main apparatus;
   wherein at least one of the local wireless apparatuses provided in each service area comprises a combining/distributing unit which distributes a downlink signal, containing the baseband signal which is received from the base-station main apparatus and which is to be transmitted from a high-order apparatus to the mobile terminal device, to the local wireless apparatuses installed in the sub areas in the service area in which the mobile terminal device exists, the combining/distributing unit combining multiple uplink signals, containing the baseband signals to be transmitted to the high-order apparatus, and transmitting a resulting uplink composite signal to the base-station main apparatus, wherein, for each service area, the combining/distributing unit generates the uplink composite signal by determining an average value of multiple uplink signals received from the respective local wireless apparatuses installed in the sub areas.

4. The wireless base-station system according to claim 3, wherein, for each service area, the local wireless apparatuses radiate radio-frequency signals, generated from a same baseband signal, into the corresponding sub areas at a same time.

5. A local wireless apparatus which are installed in sub area into service area and the local wireless apparatus performing wireless communication with the mobile terminal devices and transmitting/receiving the baseband signal for each mobile terminal device to/from the base-station main apparatus;
   wherein the local wireless apparatus provided in each service area comprises a combining/distributing unit which distributes a downlink signal, containing the baseband signal which is received from the base-station main apparatus and which is to be transmitted from a high-order apparatus to the mobile terminal device, to the local wireless apparatus installed in the sub area in the service area in which the mobile terminal device exists, when a plurality of service areas including a sub area respectively exist, the combining/distributing unit combining multiple uplink signals, containing the baseband signals to be transmitted to the high-order apparatus, and transmitting a resulting uplink composite signal to the base-station main apparatus, wherein, for each service area, the combining/distributing unit generates the uplink composite signal by determining an average value of multiple uplink signals received from the respective local wireless apparatuses installed in the sub areas.

6. A server which is provided between a base-station main apparatus for performing processing on baseband signals for respective mobile terminal devices and a plurality of local wireless apparatuses for performing wireless communication with each mobile terminal device which exists in a service area, the server relaying downlink signals transmitted from a high-order apparatus to the mobile terminal devices via the base-station main apparatus and uplink signals transmitted from the mobile terminal devices to the high-order apparatus via the local wireless apparatuses, the server comprising:
   a combining/distributing unit which distributes downlink signals, containing the baseband signals received from the base-station main apparatus, to the local wireless apparatuses pre-installed in sub areas into which the service area in which a receiving-end mobile terminal device exists is divided, combining/distributing unit combining multiple uplink signals, containing the baseband signals received from the respective local wireless apparatuses, and transmitting a resulting composite signal to the base-station main apparatus, wherein, for each service area, the combining/distributing unit generates the uplink composite signal by determining an average value of multiple uplink signals received from the respective local wireless apparatuses installed in the sub areas.

7. A signal relaying method which is executed in a wireless base-station system, including a base-station main apparatus for performing processing on baseband signals for respective mobile terminal devices and a plurality of local wireless apparatuses for performing wireless communication with each mobile terminal device which exists in a service area, to relay downlink signals transmitted from a high-order apparatus to the mobile terminal devices via the base-station main apparatus and uplink signals transmitted from the mobile terminal devices to the high-order apparatus via the local wireless apparatuses, the method comprising the steps of:
   distributing downlink signals, containing the baseband signals received from the base-station main apparatus, to the local wireless apparatuses pre-installed in sub areas into which the service area in which a receiving-end mobile terminal device exists is divided; and
   combining multiple uplink signals, containing the baseband signals received from the respective local wireless apparatuses installed in the sub areas in the service area in the service area in which the mobile terminal device exists, and transmitting a resulting composite signal to the base-station main apparatus, further comprising a step of generating the uplink composite signal by determining an average value of multiple uplink signals received from the respective local wireless apparatuses installed in the sub areas, for each service area.

* * * * *